United States Patent [19]
de Buyl et al.

[11] Patent Number: 5,948,854
[45] Date of Patent: Sep. 7, 1999

[54] ALKOXY-FUNCTIONAL RTV COMPOSITIONS WITH INCREASED GREEN STRENGTH AND INCREASED STORAGE STABILITY

[75] Inventors: Francois de Buyl, Brussels, Belgium; Robert H. Krahnke, Midland, Mich.; Timothy B. Lueder, Mt. Pleasant, Mich.; Richard A. Palmer, Midland, Mich.

[73] Assignees: Dow Corning S.A., Seneffe, Belgium; Dow Corning Corporation, Midland, Mich.

[21] Appl. No.: 08/937,525

[22] Filed: Sep. 25, 1997

[51] Int. Cl.$^6$ ........................................... C08K 3/14
[52] U.S. Cl. .................. 524/788; 523/209; 523/216; 523/213; 524/783; 524/785; 524/786; 524/789; 524/860; 524/588; 524/425; 528/17
[58] Field of Search ..................... 524/860, 788, 524/588, 789, 786, 783, 785, 425; 523/209, 216, 213; 528/17

[56] References Cited

U.S. PATENT DOCUMENTS

| | | | |
|---|---|---|---|
| 4,387,177 | 6/1983 | Mine et al. | 524/425 |
| 4,525,565 | 6/1985 | Laisney et al. | 528/17 |
| 4,525,566 | 6/1985 | Homan et al. | 528/17 |
| 4,530,882 | 7/1985 | Homan et al. | 428/452 |
| 4,585,705 | 4/1986 | Broderick et al. | 428/447 |
| 4,681,908 | 7/1987 | Broderick et al. | 524/268 |
| 4,743,474 | 5/1988 | Homan | 427/387 |
| 4,871,827 | 10/1989 | Klosowski et al. | 528/17 |
| 4,888,404 | 12/1989 | Klosowski et al. | 528/15 |
| 5,286,766 | 2/1994 | Arai et al. | 523/213 |
| 5,840,794 | 11/1998 | Palmer | 528/17 |

FOREIGN PATENT DOCUMENTS

| | | |
|---|---|---|
| 621150 | 6/1992 | Australia . |
| 4210349 | 10/1993 | Germany . |

*Primary Examiner*—Melvyn I. Marquis
*Attorney, Agent, or Firm*—Patricia M. Scaduto

[57] ABSTRACT

Alkoxy-functional room temperature vulcanizing (RTV) compositions, curable in the presence of moisture, comprising polymers containing on average at least 1.2 alkoxysilyl chain terminations per molecule, a tetraalkoxytitanium compound containing on average greater than 90 mole percent of the alkoxy groups as tertiary amyloxy groups, a filler, and an alkoxysilane. The addition of these components in amounts to satisfy defined molar ratios provide alkoxy-functional RTV compositions having both improved storage stability and improved green strength upon curing.

24 Claims, No Drawings

ALKOXY-FUNCTIONAL RTV COMPOSITIONS WITH INCREASED GREEN STRENGTH AND INCREASED STORAGE STABILITY

BACKGROUND OF THE INVENTION

1. Field of the Invention

This invention relates to alkoxy-functional room temperature vulcanizing (RTV) compositions, curable in the presence of moisture, comprising polymers containing on average at least 1.2 alkoxysilyl chain terminations per molecule, a tetraalkoxytitanium compound containing on average greater than 90 mole percent of the alkoxy groups as tertiary amyloxy groups, a filler, and an alkoxysilane. The addition of these components in amounts to satisfy defined molar ratios provide alkoxy-functional RTV compositions having both improved storage stability and improved green strength upon curing.

2. Background Information

Polyorganosiloxane compositions which cure to elastomeric materials at room temperature are well known. Such compositions can be obtained by mixing polydiorganosiloxanes having reactive groups, such as silanol groups, with silane crosslinking agents, for example, alkoxysilanes, acetoxysilanes, oximosilanes, or aminosilanes. Compositions comprising these ingredients can then be cured by exposure to atmospheric moisture at room temperature.

Moisture curable compositions are well known for their use as sealants. In certain applications, such as the manufacture of insulated glass window units, it is necessary to use a sealant which can quickly develop green strength so that elements of a construction can be formed and will maintain the desired configuration even if handled, packaged, and shipped after relatively short cure times, without showing permanent deformation.

Sealant compositions which can quickly develop green strength include silicone sealant compositions which evolve acetic acid, ketoximes, or amines as by-products during cure. These by-products have unpleasant odors and may corrode sensitive metals or plastics. The use of other compositions which would not have these properties would therefore be beneficial. One potential alternative to these compositions is an alkoxy-functional RTV composition containing tetraalkoxytitanium compounds derived from primary or secondary alcohols and liberating alcohol during cure. However, the alkoxy-functional RTV compositions containing these tetraalkoxytitanium compounds derived from primary or secondary alcohols do not have sufficient green strength for applications requiring packing and shipping of assembled components soon after manufacture.

The present inventors have unexpectedly determined that alkoxy-functional RTV compositions have improved green strength upon curing and improved storage stability when on average greater than 90 mole percent of the alkoxy groups of the tetraalkoxytitanium compound are tertiary-amyloxy (t-amyloxy) groups and the components are added in amounts to satisfy defined molar ratios. The term "green strength" as defined herein means a high-modulus skin of sufficient strength that elements of a construction can be formed and will maintain the desired configuration even if handled, packaged, and shipped after relatively short cure times, without showing permanent deformation. The term "storage stability" as defined herein means that the uncured composition maintains its rheology during storage and when cured, the green strength is essentially the same or improved relative to the green strength of the composition prior to storage.

One objective of this invention is to prepare an alkoxy-functional RTV composition having improved green strength upon curing. Another objective of this invention is to prepare an alkoxy-functional RTV composition having improved storage stability.

SUMMARY OF THE INVENTION

The present invention is an alkoxy-functional RTV composition which is curable in the presence of moisture comprising polymers comprising on average at least 1.2 alkoxysilyl chain terminations per molecule, a tetraalkoxytitanium compound containing on average greater than 90 mole percent of the alkoxy groups as tertiary amyloxy groups, a filler, and an alkoxysilane, each component being added in amounts to satisfy defined molar ratios.

DETAILED DESCRIPTION OF THE INVENTION

This invention is an alkoxy-functional RTV composition, curable in the presence of moisture, comprising (A) polymers comprising on average at least 1.2 alkoxysilyl chain terminations per molecule described by

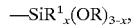
—$SiR^1_x(OR)_{3-x}$, where each R is independently selected from the group consisting of methyl, ethyl, n-propyl, isopropyl, n-butyl, sec-butyl, and isobutyl, $R^1$ is selected from the group consisting of methyl and ethyl, and x is 0 or 1;

(B) a tetraalkoxytitanium compound comprising on average greater than 90 mole percent of the alkoxy groups as t-amyloxy groups;

(C) a filler having hydroxyl content derived from covalently bonded hydroxyl groups, adsorbed water, or both covalently bonded hydroxyl groups and adsorbed water; and (D) an alkoxysilane described by formula

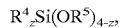
$R^4_z Si(OR^5)_{4-z}$, where each $R^4$ is independently selected from the group consisting of methyl, ethyl, and vinyl, each $R^5$ is independently selected from the group consisting of methyl and ethyl, and z is 1 or 2; with the proviso that components (A), (B), (C), and (D) are added in amounts such that a molar ratio (I) is at least 0.9 and a molar ratio (II) is at least 0.6, where $$\text{molar ratio (I)} = \frac{\text{moles Component (B)} + \text{moles Component (D)}}{\text{moles hydroxyl in Component (C)}}$$

and $$\text{molar ratio (II)} = \frac{\text{moles Component (B)}}{\text{moles Component (D)} + \text{moles alkoxysilyl chain terminations in Component (A)}}.$$

Component (A) comprises polymers comprising on average at least 1.2 alkoxysilyl chain terminations per molecule described by the formula —SiR$^1_x$(OR)$_{3-x}$, where R, R$^1$ and x are as defined above. The polymers may be linear or branched and may be homopolymers, copolymers, or terpolymers. The polymers may be a single species or a mixture of different polymers so long as the polymers comprise on average at least 1.2 alkoxysilyl chain terminations per molecule.

The repeating units of the polymers of Component (A) may include organic units, such as oxyalkylene units, or preferably siloxy units such as described by R$^9_s$SiO$_{(4-s)/2}$, where each R$^9$ is independently selected from the group consisting of alkyl groups comprising 1 to 6 carbon atoms, phenyl, and fluorinated alkyl groups, and s is 0, 1, or 2. Examples of the alkyl groups described by R$^9$ include methyl, ethyl, propyl, butyl and hexyl. An example of the fluorinated alkyl groups described by R$^9$ includes 3,3,3-trifluoropropyl. The preferred polymers of Component (A) comprise polydiorganosiloxanes having repeating units described by —(R$^9_s$SiO$_{(4-s)/2}$)$_f$—, where R$^9$ is methyl, s is 2, and f is a value such that Component (A) has a viscosity within a range of about 0.5 to 3000 Pa.s at 25° C. and preferably within a range of about 5 to 150 Pa.s at 25° C.

The polymers of Component (A) comprise on average at least 1.2 alkoxysilyl chain terminations per molecule described by the formula —SiR$^1_x$(OR)$_{3-x}$, where R, R$^1$ and x are as defined above. In preferred embodiments, R is independently selected from the group consisting of methyl and ethyl, and x is 0.

In more preferred embodiments, a spacer group Z is bonded to the silicon atom of the alkoxysilyl chain termination, where Z is selected from the group consisting of a divalent hydrocarbon radical free of aliphatic unsaturation comprising about 2 to 18 carbon atoms and a combination of divalent hydrocarbon radicals and siloxane segments comprising about 2 to 7 silicon atoms described by

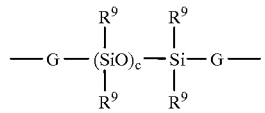

where R$^9$ is as defined above, each G is a divalent hydrocarbon radical free of aliphatic unsaturation comprising about 2 to 18 carbon atoms, and c is a whole number within a range of about 1 to 6. Examples of the divalent hydrocarbon radicals describing Z and G include alkylene radicals such as ethylene, methylmethylene, propylene, butylene, pentylene, and hexylene; and arylene radicals including phenylene; with alkylenes being preferred, and in particular ethylene. More preferably, Z is a combination of divalent hydrocarbon radicals and siloxane segments, as described above, where G is an alkylene, preferably, ethylene; R$^9$ is methyl; and c is 1.

The polymers of Component (A) are required to have on average at least 1.2 alkoxysilyl chain terminations per molecule, and preferably, the polymers of Component (A) comprise on average at least 1.5 alkoxysilyl chain terminations per molecule. Since the polymers of Component (A) are required to have on average at least 1.2 alkoxysilyl chain terminations per molecule, some polymers may contain other types of chain terminations. Preferably, this other type of chain termination comprises organosilyl chain terminations selected from the group consisting of CH$_2$=CH—Si(R$^9$)$_2$— and (R$^2$)$_3$—Si—, where R$^9$ is as defined above and each R$^2$ is independently selected from the group consisting of methyl, ethyl, and vinyl. Examples of organosilyl chain terminations include trimethylsilyl, triethylsilyl, vinyldimethylsilyl, and vinylmethylphenylsilyl, with vinyldimethylsilyl being preferred.

The polydiorganosiloxanes useful in this invention, as well as crosslinkers, fillers, and other optional ingredients useful in alkoxy-functional RTV silicone sealant compositions are well known in the art and are illustrated by Ceyzeriat et al., U.S. Pat. No. 3,151,099; Brown et al., U.S. Pat. No. 3,161,614; Weyenberg, U.S. Pat. No. 3,175,993 and U.S. Pat. No. 3,334,067; Klosowski et al., U.S. Pat. No. 4,871,827; Kamis et al., U.S. Pat. No. 4,898,910; and Chu et al., U.S. Pat. No. 4,956,435; all of which are hereby incorporated by reference to show alkoxy-functional RTV silicone sealant ingredients and methods of preparing alkoxy-functional RTV silicone sealant compositions.

Polydiorganosiloxanes within the scope of Component (A), are exemplified by the disclosures of Brown et al., U.S. Pat. No. 3,161,614, and are described, for example, by formula (I)

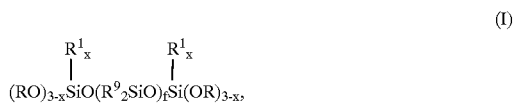

and by mixtures of the polydiorganosiloxanes described by formula (I) and polydiorganosiloxanes described, for example, by formula (II)

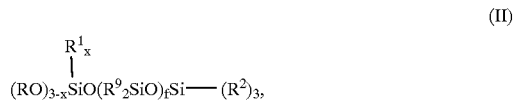

where R, R$^1$, R$^2$, R$^9$, x, and f are as defined above.

Preferred polydiorganosiloxanes within the scope of Component (A), include those described by Weyenberg, U.S. Pat No. 3,175,993 and Klosowski et al., U.S. Pat. No. 4,871,827, which are hereby incorporated by reference, and can be described, for example, by formula (III)

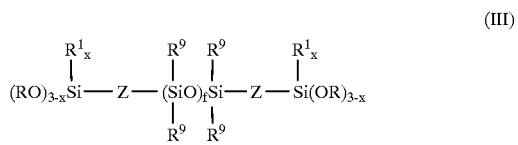

where R, R$^1$, R$^9$, Z, x, and f are as described above.

The more preferred Component (A) polymers useful in this invention are mixtures of the polydiorganosiloxanes described by formula (III) and polydiorganosiloxanes described by Kamis et al., U.S. Pat. No. 4,898,910, which is hereby incorporated by reference, and described, for example, by formula (IV)

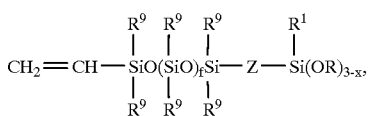

(IV)

where R, $R^1$, $R^9$, Z, x and f are as defined above.

When Component (A) comprises mixtures of polydiorganosiloxanes described by formulas (III) and (IV), typically 40 percent or less of the chain terminations will be organosilyl chain terminations, with preferably less than 25 percent of the chain terminations being organosilyl chain terminations.

Component (A) also includes organic polymers comprising on average at least 1.2 alkoxysilyl chain terminations per molecule described by —$SiR^1_x(OR)_{3-x}$, where R, $R^1$, and x are as defined above. The organic polymers within the scope of Component (A) may also comprise a spacer group —Z— bonded to the silicon atom of the alkoxysilyl chain termination, where Z is as defined above. One type of organic polymer useful in the invention is the polyoxyalkylene, described by Okawa et al., U.S. Pat. No. 5,403,881, and hereby incorporated by reference to show polyoxyalkylene polymers comprising on average at least 1.2 alkoxysilyl chain terminations per molecule described by —$SiR^1_x(OR)_{3-x}$ and methods of preparing these polymers, where R, $R^1$, and x are as defined above.

The amount of Component (A) useful in the alkoxy-functional RTV compositions of this invention is dependent on the amounts of other components added so that molar ratios (I) and (II) as described below are met. Typically, however, Component (A) is added in amounts from about 30 to 85 weight percent based on the total weight of the alkoxy-functional RTV composition.

The alkoxy-functional RTV compositions of the present invention also comprise a tetraalkoxytitanium compound (B) comprising on average greater than 90 mole percent of the alkoxy groups as t-amyloxy groups. This tetraalkoxytitanium compound can be a single species or a mixture of different tetraalkoxytitanium compounds, so long as on average Component (B) comprises greater than 90 mole percent of the alkoxy groups as t-amyloxy groups. It is preferred that the tetraalkoxytitanium compound comprise on average at least 98 mole percent of the alkoxy groups as t-amyloxy groups.

The alkoxy groups substituted on the tetraalkoxytitanium compound which are not t-amyloxy groups can include any alkoxy group having from 1 to 6 carbon atoms. Examples of these groups include methoxy, ethoxy, n-propyloxy, isopropyloxy, n-butoxy, t-butoxy, and hexoxy.

The tetraalkoxytitanium compounds of this invention may be prepared in different ways. For example, the tetraalkoxytitanium compounds can be prepared by reacting tetrachlorotitanium or a tetraalkoxytitanium such as tetraisopropoxytitanium with tertiary-amyl alcohol. These reactions produce hydrochloric acid as a by-product if the tetrachlorotitanium is used; or an alcohol, such as isopropanol, as a by-product, if the tetraalkoxytitanium is used, which byproducts are preferably removed from the reaction medium. In the alkoxy exchange method, the starting tetraalkoxytitanium is preferably selected to ensure easy removal of the alcohol byproduct by vacuum devolatilization. Therefore, the alcohol by-product should have a boiling point which permits its easy removal from the reaction mixture without interfering with the preparation of the desired tetraalkoxytitanium compound. For example, the boiling points of isopropanol and tertiary-amyl alcohol are 82° C. and 102° C., respectively. Reaction of tertiary-amyl alcohol favorably replaces the alkoxy groups on tetraisopropoxytitanium, tetraethoxytitanium, and tetramethoxytitanium to produce a tetraalkoxytitanium containing t-amyloxy groups. These reactions would be continued until on average greater than 90 mole percent of the alkoxy groups on the tetraalkoxytitanium have exchanged with the tertiary-amyl alcohol.

The amount of Component (B) useful in the alkoxy-functional RTV compositions of this invention is dependent on the amounts of other components added so that molar ratios (I) and (II) as described below are met. Typically, however, Component (B) is added in amounts in the range of about 0.1 to 5 weight percent based on the total weight of the alkoxy-functional RTV composition. Preferably, Component (B) is added in amounts in the range of about 1.5 to 3.5 weight percent on the same basis. The tetraalkoxytitanium compound may be a single species or a mixture of two or more species.

The alkoxy-functional RTV compositions of the present invention also comprise a filler (C) having hydroxyl content derived from covalently bonded hydroxyl groups, adsorbed water, or both covalently bonded hydroxyl groups and adsorbed water.

The term "covalently bonded hydroxyl groups", as defined herein, means those hydroxyl groups covalently bonded to the filler which are available for reaction. The term "adsorbed water", as defined herein, means associated water on the filler surface available for reaction and water from within the filler which becomes available for reaction.

A particular filler may only have adsorbed water and may not have any covalently bonded hydroxyl groups. However, many fillers have both covalently bonded hydroxyl groups and adsorbed water, for example, untreated fumed silica filler. The hydroxyl content of a filler can be altered by drying the filler and/or pretreating the filler with hydrophobing agents such as hexamethyldisilazane. It is preferred to use fillers which have a low hydroxyl content.

The filler can be selected from those known to be useful in alkoxy-functional RTV sealants. The fillers include ground, precipitated, and colloidal calcium carbonates which are untreated or treated with stearate; reinforcing silicas such as fumed silicas, precipitated silicas, and hydrophobed silicas; crushed quartz, ground quartz, alumina, aluminum hydroxide, titanium dioxide, diatomaceous earth, iron oxide, carbon black, and graphite. Fumed silica and calcium carbonate are especially useful and blends of reinforcing fumed silica filler and ground calcium carbonate are preferred.

The amount of filler useful in the alkoxy-functional RTV compositions generally is that amount of filler which provides the desired properties to the uncured composition such as viscosity, thixotropy, pigmentation, and UV protection. The amount of filler also depends upon the cured physical properties desired such as tensile strength, elongation, and durometer.

The amount of filler useful in the alkoxy-functional RTV compositions of this invention is dependent not only on the above but also on the amounts of other components added, as well as the hydroxyl content of the specific filler used, so that molar ratios (I) and (II) as described below are met. Typically, however, the filler is added in amounts in the range of about 5 to 50 weight percent based on the total weight of the alkoxy-functional RTV composition. The filler may be a single species or a mixture of two or more species.

The alkoxy-functional RTV compositions of the present invention also comprise an alkoxysilane (D) described by formula $$R^4_z Si(OR^5)_{4-z}$$

where each $R^4$ is independently selected from the group consisting of methyl, ethyl, and vinyl, each $R^5$ is independently selected from the group consisting of methyl and ethyl, and z is 1 or 2. Examples of useful alkoxysilanes include methyltrimethoxysilane, methyltriethoxysilane, vinyltrimethoxysilane, vinyltriethoxysilane, ethyltrimethoxysilane, ethyltriethoxysilane, dimethyldimethoxysilane, vinylmethyldimethoxysilane, dimethyldiethoxysilane, and ethylmethyldiethoxysilane. The partial hydrolyzates of these alkoxysilanes can also be used in the present composition. Preferred alkoxysilanes include methyltrimethoxysilane and dimethyldimethoxysilane.

The amount of alkoxysilane useful in the alkoxy-functional RTV compositions of this invention is dependent on the amounts of other components added so that molar ratios (I) and (II) as described below are met. Typically, however, the alkoxysilane is added in amounts in the range of about 0.1 to 10 weight percent based on the total weight of the alkoxy-functional RTV composition, with amounts in the range of about 0.1 to 3 weight percent on the same basis being preferred. The alkoxysilane may be a single species or a mixture of two or more species.

Molar ratio (I) is defined herein as the sum of the moles of tetraalkoxytitanium compound (Component (B)) plus the moles of alkoxysilane (Component (D)) divided by the moles of hydroxyl content in the filler (Component(C)). When the alkoxy-functional RTV compositions of the present invention have a molar ratio (I) of at least 0.9 improved storage stability is obtained. For preferred embodiments, molar ratio (I) is in the range of about 0.9 to 5, and more preferably molar ratio (I) is in the range of about 1 to 2.5. Although improved storage stability is obtained when molar ratio (I) is above 5, other considerations make these compositions less desirable. For example, since both the alkoxysilane and the tetraalkoxytitanium compound are in the numerator of molar ratio (I), having a ratio greater than 5 could mean increasing one or both of those components. However, increased amounts of alkoxysilane tends to decrease the development of green strength and increased amounts of the tetraalkoxytitanium compound adds cost to the composition and reduces the hydrolytic stability. The hydroxyl content in the filler could also be reduced to decrease the denominator of molar ratio (I), however, it is impractical to reduce the hydroxyl content of the filler below a certain level.

Molar ratio (II) is defined herein as the moles of tetraalkoxytitanium compound (Component (B)) divided by the sum of the moles of alkoxysilane (Component (D)) plus the moles of alkoxysilyl chain terminations in the polymers (Component (A)). When the alkoxy-functional RTV compositions of the present invention have a molar ratio (II) of at least 0.6, improved green strength is obtained. For preferred embodiments, molar ratio (II) is in the range of about 0.6 to 2, and more preferably molar ratio (II) is in the range of about 0.65 to 1. Although improved green strength is obtained when molar ratio (II) is above 2, other considerations make these compositions less desirable. For example, increased amounts of the tetraalkoxytitanium compound adds cost to the composition and reduces the hydrolytic stability.

Other ingredients which are conventionally used in alkoxy-functional RTV compositions such as adhesion promoters, rheology additives, fungicides, colorants, pigments, and plasticizers, can be added as long as they do not interfere with the rapid development of green strength, either initially or upon storage, or reduce other desired properties.

Where organofunctional trialkoxysilanes are used as adhesion promoters and their amounts are such that the moles of organofunctional trialkoxysilane may be significant with respect to the moles of alkoxysilane added, it may be desirable to include the moles of such adhesion promoter as part of the moles of alkoxysilane in determining molar ratios (I) and (II).

The alkoxy-functional RTV compositions of this invention have improved green strength and storage stability. These results occur when on average greater than 90 mole percent of the alkoxy groups bonded to the tetraalkoxytitanium compound are t-amyloxy groups and molar ratios (I) and (II) are met.

This invention is further illustrated by the following examples which are presented for that purpose and are not intended to limit the scope of the claims herein. In the examples, "part" or "parts" refer to part by weight or parts by weight (expressed as "pbw") and viscosities were measured at 25° C. Me represents methyl, AS chain term represents alkoxysilyl chain terminations, Ot-Am represents tertiary-amyloxy, Ot-Bu represents tertiary-butoxy, and OiPr represents isopropoxy.

INGREDIENTS USED IN THE EXAMPLES

Polymer=a polymer mixture of polydimethylsiloxanes where one type of polymer is described by formula

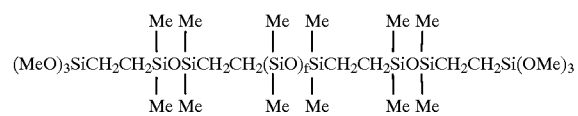

and another type of polymer is described by formula

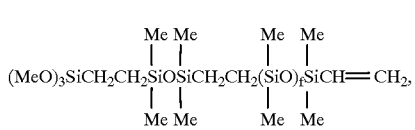

where in the polymer mixture 20 percent of the chain terminations are organosilyl chain terminations and f had an average value such that the polymer mixture's overall viscosity was 60 Pa.s. Some small fraction of a polymer where both chain terminations are organosilyl chain terminations may be present as a by-product from the preparation of the polymers.

Titanium 1=a mixture of titanium molecules having an average formula $Ti(Ot-Am)_{3.92}(OiPr)_{0.08}$; containing at least 98 mole percent -Ot-Am groups Titanium 2=$Ti(Ot-Bu)_4$; containing 100 mole percent -Ot-Bu groups Titanium 3=a mixture of titanium molecules having an average formula $Ti(Ot\text{-}Am)_{3.6}(OiPr)_{0.4}$; containing 90 mole percent -Ot-Am groups
Alkoxysilane 1=methyltrimethoxysilane
Alkoxysilane 2=dimethyldimethoxysilane
Silica Filler=fumed silica filler having a surface area of 150 $m^2/g$ and an adsorbed water content of 0.6 weight percent
$CaCO_3$=a ground calcium carbonate having an average particle size of 2–3 micrometers, surface treated with stearic acid, and having an adsorbed water content of 0.05 weight percent
ppt $CaCO_3$=a precipitated calcium carbonate having a surface area of about 22 $m^2/g$, surface treated with stearic acid and having an adsorbed water content of 0.4 weight percent
Adhesion Promoter=a mixture of aminopropyltrimethoxysilane and glycidoxypropyltrimethoxysilane
Rheology Additive=a silicone polyether

GREEN STRENGTH MEASUREMENT BY LAP SHEAR

Alkoxy-functional RTV sealant compositions were prepared, under conditions to exclude moisture, using the ingredients and procedures described in the following examples. After five days storage at 25° C. and 50% relative humidity, aluminum lap shear joints were constructed and tested as described below. Aluminum panels measuring 2.54 cm×7.62 cm were assembled into lap shear joints with a 2.54 cm overlap. The glue line thickness was 0.254 cm. Samples were allowed to cure for 30 minutes by exposure to atmospheric conditions of 25° C. and 50% relative humidity and then the green strength values were measured. The values were measured using an Instron Tensile Tester at a pull rate of 1.27 cm per minute. The values for three lap shear panels were averaged and reported as the green strength for each formulation. Green strength (lap shear) testing following 30 minutes of cure time was repeated after storing the uncured sealant for 1 week at 50° C.

EXTRUSION RATE

The extrusion rate was determined by test procedure MIL-S-8802D on the uncured RTV silicone sealant composition by extruding it through a nozzle with a 0.32 cm orifice at 620 KPa pressure and measuring the amount extruded in grams per minute (g/min).

EXAMPLES 1–3

Three alkoxy-functional RTV sealant compositions were each prepared, under conditions to exclude moisture, using the ingredients described in Table I. The compositions were prepared by first adding alkoxysilane and titanium compound to the polymer, mixing, adding filler, mixing, and drawing a vacuum to remove incorporated air. The moles of groups and ingredients were based on 100 grams of the RTV sealant composition and appear in Table I in parenthesis below the weight parts. Molar ratios (I) and (II) as defined in this specification, were determined using the provided mole values. The alkoxy-functional RTV sealant compositions were stored in containers sealed to prevent atmospheric moisture from entering. Green strength testing was done as described above and the results are provided in Table I.

Example 1 shows excellent green strength both initially and after storage at 1 week/50° C. using Titanium 1, a tetraalkoxytitanium compound containing at least 98 mole % Ot-Am groups as compared to the green strength results obtained using Titanium 2 and Titanium 3 which are both outside the scope of this invention.

TABLE I

Use of Different Tetraalkoxytitanium Compounds

| INGREDIENT | EXAMPLE | | |
|---|---|---|---|
| | 1 | 2* | 3* |
| POLYMER, pbw | 52.75 | 52.75 | 53.00 |
| (moles AS chain term.) | (0.00138) | (0.00138) | (0.00138) |
| TITANIUM 1, pbw | 2.00 | 0.0 | 0.0 |
| (moles titanium) | (0.00505) | (0.0) | (0.0) |
| TITANIUM 2, pbw | 0.0 | 0.0 | 1.75 |
| (moles titanium) | (0.0) | (0.0) | (0.00515) |
| TITANIUM 3, pbw | 0.0 | 2.0 | 0.0 |
| (moles titanium) | (0.0) | (0.00505) | (0.0) |
| ALKOXYSILANE 1, pbw | 0.75 | 0.75 | 0.75 |
| (moles silane) | (0.00551) | (0.00551) | (0.00551) |
| SILICA FILLER, pbw | 3.5 | 3.5 | 3.5 |
| (moles OH) | (0.00233) | (0.00233) | (0.00233) |
| CaCO3, pbw | 40.0 | 40.0 | 40.0 |
| (moles OH) | (0.00222) | (0.00222) | (0.00222) |
| RHEOLOGY ADDITIVE, pbw | 0.5 | 0.5 | 0.5 |
| ADHESION PROMOTER, pbw | 0.5 | 0.5 | 0.5 |
| MOLAR RATIO (I) | 2.32 | 2.32** | 2.34** |
| MOLAR RATIO (II) | 0.73 | 0.73** | 0.75** |
| EXTRUSION RATE (g/min) | 81 | 93 | 85 |
| GREEN STRENGTH, Pa (Initial) | 7584 | 5516 | 4826 |
| GREEN STRENGTH, Pa (1 week/50° C. aging) | 9653 | 4137 | 5516 |

*Comparative Example
**These values for molar ratio (I) and molar ratio (II) include moles of Titanium 2 and moles of Titanium 3 which were not within the scope of the titanium compound of the present invention.

EXAMPLES 4–7

RTV sealant compositions were prepared and tested in the same manner as Examples 1–3, the ingredients, their amounts, and the properties measured are provided in Table II. Comparative Examples 4 and 6 illustrate the criticality of the lower end of molar ratios (I) and (II) for improved green strength.

TABLE II

Compositions Having Varying Molar Ratios

| INGREDIENT | EXAMPLE | | | | |
|---|---|---|---|---|---|
| | 1 | 4* | 5 | 6* | 7 |
| POLYMER, pbw | 52.75 | 54.80 | 47.30 | 53.40 | 51.75 |
| (moles AS chain term) | (0.00138) | (0.00143) | (0.00123) | (0.00139) | (0.00135) |
| TITANIUM 1, pbw | 2.00 | 0.60 | 5.70 | 1.00 | 3.50 |
| (moles titanium) | (0.00505) | (0.00152) | (0.0144) | (0.00253) | (0.00884) |

TABLE II-continued

Compositions Having Varying Molar Ratios

| | EXAMPLE | | | | |
|---|---|---|---|---|---|
| INGREDIENT | 1 | 4* | 5 | 6* | 7 |
| ALKOXYSILANE 1, pbw | 0.75 | 0.10 | 2.50 | 1.10 | 0.25 |
| (moles silane) | (0.00551) | (0.000735) | (0.0184) | (0.00809) | (0.00184) |
| SILICA FILLER, pbw | 3.5 | 3.5 | 3.5 | 3.5 | 3.5 |
| (moles OH) | (0.00233) | (0.00233) | (0.00233) | (0.00233) | (0.00233) |
| CaCO3, pbw | 40.0 | 40.0 | 40.0 | 40.0 | 40.0 |
| (moles OH) | (0.00222) | (0.00222) | (0.00222) | (0.00222) | (0.00222) |
| RHEOLOGY ADDITIVE, pbw | 0.5 | 0.5 | 0.5 | 0.5 | 0.5 |
| ADHESION PROMOTER, pbw | 0.5 | 0.5 | 0.5 | 0.5 | 0.5 |
| MOLAR RATIO (I) | 2.32 | 0.49 | 7.19 | 2.33 | 2.34 |
| MOLAR RATIO (II) | 0.73 | 0.70 | 0.73 | 0.27 | 2.77 |
| EXTRUSION RATE (g/min) | 81 | 46 | 194 | 90 | 63 |
| GREEN STRENGTH, Pa (Initial) | 7584 | 689 | 6205 | 689 | 17237 |
| GREEN STRENGTH, Pa (1 week/50° C. aging) | 9653 | 2068 | 6895 | 689 | 17926 |

*Comparative Example

EXAMPLES 8–10

RTV sealant compositions were prepared and tested in the same manner as Examples 1–3, the ingredients, their amounts, and the properties measured are provided in Table III. Examples 8 and 9 show that improved green strength is obtainable using different fillers and Example 10 shows that improved green strength is obtainable using an alkoxysilane having 2 alkoxy groups.

TABLE III

Affect of Fillers or Alkoxysilane

| | EXAMPLE | | | |
|---|---|---|---|---|
| INGREDIENT | 1 | 8 | 9 | 10 |
| POLYMER, pbw | 52.75 | 88.50 | 54.50 | 53.25 |
| (moles AS chain term) | (0.00138) | (0.00231) | (0.00142) | (0.00139) |
| TITANIUM 1, pbw | 2.00 | 2.25 | 3.50 | 2.00 |
| (moles titanium) | (0.00505) | (0.00568) | (0.00884) | (0.00505) |
| ALKOXYSILANE 1, pbw (moles silane) | 0.75 (0.00551) | 0.75 (0.00551) | 1.50 (0.0110) | 0.0 (0.0) |
| ALKOXYSILANE 2, pbw (moles silane) | 0.0 (0.0) | 0.0 (0.0) | 0.0 (0.0) | 0.66 (0.00550) |
| SILICA FILLER, pbw | 3.5 | 7.0 | 0.0 | 3.5 |
| (moles OH) | (0.00233) | (0.00467) | (0.0) | (0.00233) |
| CaCO3, pbw | 40.0 | 0.0 | 0.0 | 40.0 |
| (moles OH) | (0.00222) | (0.0) | (0.0) | (0.00222) |
| ppt. CaCO3, pbw | 0.0 | 0.0 | 40.0 | 0.0 |
| (moles OH) | (0.0) | (0.0) | (0.0178) | (0.0) |
| RHEOLOGY ADDITIVE, pbw | 0.5 | 1.0 | 0.0 | 0.5 |
| ADHESION PROMOTER, pbw | 0.5 | 0.5 | 0.5 | 0.5 |
| MOLAR RATIO (I) | 2.32 | 2.40 | 1.12 | 2.32 |
| MOLAR RATIO (II) | 0.73 | 0.73 | 0.71 | 0.73 |
| EXTRUSION RATE (g/min) | 81 | 100 | 93 | 56 |
| GREEN STRENGTH, Pa (Initial) | 7584 | 10342 | 8274 | 12411 |
| GREEN STRENGTH, Pa (1 week/50° C. aging) | 9653 | 10342 | 8963 | 10342 |

EXAMPLES 11–12

RTV sealant compositions were prepared and tested as described for Examples 1–3, the ingredients, their amounts, and the properties measured are provided in Table IV. Examples 11 and 12 show that improved green strength is still obtainable if the rheology additive or adhesion promoter are removed.

TABLE IV

Effect of Rheology Additive or Adhesion Promoter

| | EXAMPLE | | |
|---|---|---|---|
| INGREDIENT | 1 | 11 | 12 |
| POLYMER, pbw | 52.75 | 53.25 | 53.25 |
| (moles AS chain term) | (0.00138) | (0.00139) | (0.00139) |
| TITANIUM 1, pbw | 2.00 | 2.00 | 2.00 |
| (moles titanium) | (0.00505) | (0.00505) | (0.00505) |
| ALKOXYSILANE 1, pbw | 0.75 | 0.75 | 0.75 |
| (moles silane) | (0.00551) | (0.00551) | (0.00551) |
| SILICA FILLER, pbw | 3.5 | 3.5 | 3.5 |
| (moles OH) | (0.00233) | (0.00233) | (0.00233) |
| CaCO3, pbw | 40.0 | 40.0 | 40.0 |
| (moles OH) | (0.00222) | (0.00222) | (0.00222) |
| RHEOLOGY ADDITIVE, pbw | 0.5 | 0.5 | 0.0 |
| ADHESION PROMOTER, pbw | 0.5 | 0.0 | 0.5 |
| MOLAR RATIO (I) | 2.32 | 2.32 | 2.32 |
| MOLAR RATIO (II) | 0.73 | 0.73 | 0.73 |
| EXTRUSION RATE (g/min) | 81 | 103 | 90 |
| GREEN STRENGTH, Pa (initial) | 7584 | 9653 | 8274 |
| GREEN STRENGTH, Pa (1 week/50° C. aging) | 9653 | 11721 | 8274 |

We claim:

1. An alkoxy-functional RTV composition, curable in the presence of moisture, comprising (A) polymers comprising on average at least 1.2 alkoxysilyl chain terminations per molecule described by $—SiR^1_x(OR)_{3-x}$, where each R is independently selected from the group consisting of methyl, ethyl, n-propyl, isopropyl, n-butyl, sec-butyl, and isobutyl, $R^1$ is selected from the group consisting of methyl and ethyl, and x is 0 or 1;

(B) a tetraalkoxytitanium compound comprising on average greater than 90 mole percent of the alkoxy groups as t-amyloxy groups;

(C) a filler having hydroxyl content derived from covalently bonded hydroxyl groups, adsorbed water, or both covalently bonded hydroxyl groups and adsorbed water; and (D) an alkoxysilane described by formula

where each $R^4$ is independently selected from the group consisting of methyl, ethyl, and vinyl, each $R^5$ is independently selected from the group consisting of methyl and ethyl, and z is 1 or 2; with the proviso that components (A), (B), (C), and (D) are added in amounts such that a molar ratio (I) is at least 0.9 and a molar ratio (II) is at least 0.6, where $$\text{molar ratio (I)} = \frac{\text{moles Component(B)} + \text{moles Component (D)}}{\text{moles hydroxyl in Component (C)}}$$

and $$\text{molar ratio (II)} = \frac{\text{moles Component(B)}}{\text{moles Component (D)} + \text{moles alkoxysilyl chain terminations in Component (A)}}$$

2. The alkoxy-functional RTV composition according to claim 1, where molar ratio (I) is in the range of about 0.9 to 5 and molar ratio (II) is in the range of about 0.6 to 2.

3. The alkoxy-functional RTV composition according to claim 1, where molar ratio (I) is in the range of about 1 to 2.5 and molar ratio (II) is in the range of about 0.65 to 1.

4. The alkoxy-functional RTV composition according to claim 2, where the tetraalkoxytitanium compound comprises on average at least 98 mole percent of the alkoxy groups as t-amyloxy groups.

5. The alkoxy-functional RTV composition according to claim 3, where the tetraalkoxytitanium compound comprises on average at least 98 mole percent of the alkoxy groups as t-amyloxy groups.

6. The alkoxy-functional RTV composition according to claim 2, where Component (A) comprises a polydiorganosiloxane described by formula (I)

 (I)

or a mixture of the polydiorganosiloxane described by formula (I) and a polydiorganosiloxane described by formula (II)

 (II)

where each $R^2$ is independently selected from the group consisting of methyl, ethyl, and vinyl; each $R^9$ is independently selected from the group consisting of alkyl groups comprising about 1 to 6 carbon atoms, phenyl, and fluorinated alkyl groups; and f is a value such that Component (A) has a viscosity within a range of about 0.5 to 3000 Pa.s at 25° C.

7. The alkoxy-functional RTV composition according to claim 3, where Component (A) comprises a polydiorganosiloxane described by formula (I)

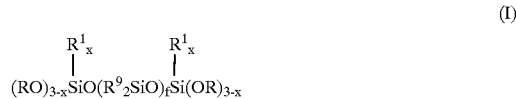 (I)

or a mixture of the polydiorganosiloxane described by formula (I) and a polydiorganosiloxane described by formula (II)

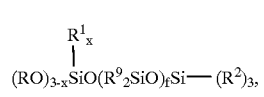 (II)

where each $R^2$ is independently selected from the group consisting of methyl, ethyl, and vinyl; each $R^9$ is independently selected from the group consisting of alkyl groups comprising about 1 to 6 carbon atoms, phenyl, and fluorinated alkyl groups; and f is a value such that Component (A) has a viscosity within a range of about 0.5 to 3000 Pa.s at 25° C.

8. The alkoxy-functional RTV composition according to claim 2, where Component (A) comprises a polydiorganosiloxane described by formula (III)

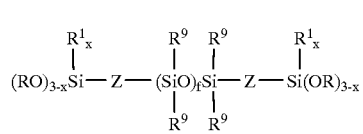 (III)

or a mixture of the polydiorganosiloxane described by formula (III) and a polydiorganosiloxane described by formula (IV)

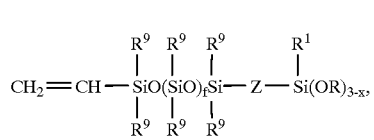 (IV)

where each $R^9$ is independently selected from the group consisting of alkyl groups comprising about 1 to 6 carbon atoms, phenyl, and fluorinated alkyl groups; f is a value such that Component (A) has a viscosity within a range of about 0.5 to 3000 Pa.s at 25° C.; and each Z is independently selected from the group consisting of a divalent hydrocarbon radical free of aliphatic unsaturation comprising about 2 to 18 carbon atoms and a combination of divalent hydrocarbon radicals and siloxane segments comprising about 2 to 7 silicon atoms described by

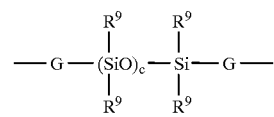

where $R^9$ is as defined above, each G is a divalent hydrocarbon radical free of aliphatic unsaturation comprising about 2 to 18 carbon atoms, and c is a whole number within a range of about 1 to 6.

9. The alkoxy-functional RTV composition according to claim 3, where Component (A) comprises a polydiorganosiloxane described by formula (III)

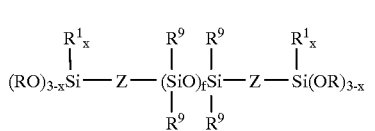
(III)

or a mixture of the polydiorganosiloxane described by formula (III) and a polydiorganosiloxane described by formula (IV)

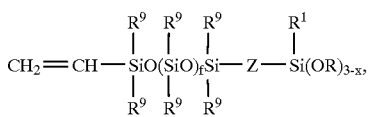
(IV)

where each $R^9$ is independently selected from the group consisting of alkyl groups comprising about 1 to 6 carbon atoms, phenyl, and fluorinated alkyl groups; f is a value such that Component (A) has a viscosity within a range of about 0.5 to 3000 Pa.s at 25° C.; and each Z is independently selected from the group consisting of a divalent hydrocarbon radical free of aliphatic unsaturation comprising about 2 to 18 carbon atoms and a combination of divalent hydrocarbon radicals and siloxane segments comprising about 2 to 7 silicon atoms described by

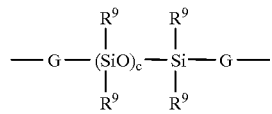

where $R^9$ is as defined above, each G is a divalent hydrocarbon radical free of aliphatic unsaturation comprising about 2 to 18 carbon atoms, and c is a whole number within a range of about 1 to 6.

10. The alkoxy-functional RTV composition according to claim 4, where Component (A) comprises a polydiorganosiloxane described by formula (III)

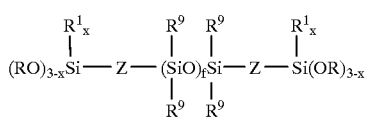
(III)

or a mixture of the polydiorganosiloxane described by formula (III) and a polydiorganosiloxane described by formula (IV)

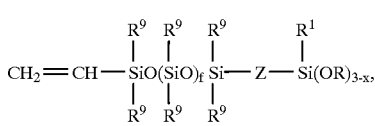
(IV)

where each $R^9$ is independently selected from the group consisting of alkyl groups comprising about 1 to 6 carbon atoms, phenyl, and fluorinated alkyl groups; f is a value such that Component (A) has a viscosity within a range of about 0.5 to 3000 Pa.s at 25° C.; and each Z is independently selected from the group consisting of a divalent hydrocarbon radical free of aliphatic unsaturation comprising about 2 to 18 carbon atoms and a combination of divalent hydrocarbon radicals and siloxane segments comprising about 2 to 7 silicon atoms described by

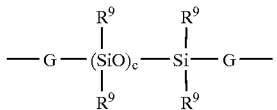

where $R^9$ is as defined above, each G is a divalent hydrocarbon radical free of aliphatic unsaturation comprising about 2 to 18 carbon atoms, and c is a whole number within a range of about 1 to 6.

11. The alkoxy-functional RTV composition according to claim 5, where Component (A) comprises a polydiorganosiloxane described by formula (III)

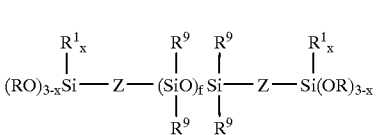
(III)

or a mixture of the polydiorganosiloxane described by formula (III) and a polydiorganosiloxane described by formula (IV)

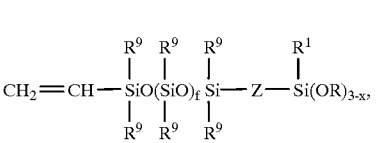
(IV)

where each $R^9$ is independently selected from the group consisting of alkyl groups comprising about 1 to 6 carbon atoms, phenyl, and fluorinated alkyl groups; f is a value such that Component (A) has a viscosity within a range of about 0.5 to 3000 Pa.s at 25° C.; and each Z is independently selected from the group consisting of a divalent hydrocarbon radical free of aliphatic unsaturation comprising about 2 to 18 carbon atoms and a combination of divalent hydrocarbon radicals and siloxane segments comprising about 2 to 7 silicon atoms described by

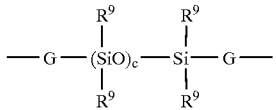

where $R^9$ is as defined above, each G is a divalent hydrocarbon radical free of aliphatic unsaturation comprising about 2 to 18 carbon atoms, and c is a whole number within a range of about 1 to 6.

12. The alkoxy-functional RTV composition according to claim 8, where each $R^9$ is independently selected from the group consisting of methyl and ethyl; x is 0; Z is an alkylene or

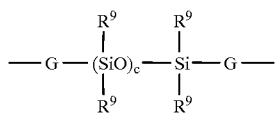

where G is an alkylene; and 40 percent or less of the chain terminations are organosilyl chain terminations described by $CH_2=CH-Si(R^9)_2-$, where $R^9$ is as defined above.

13. The alkoxy-functional RTV composition according to claim 9, where each $R^9$ is independently selected from the group consisting of methyl and ethyl, x is 0, Z is ethylene or

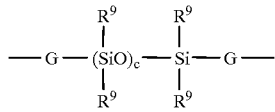

where G is ethylene, and 40 percent or less of the chain terminations are organosilyl chain terminations described by $CH_2=CH-Si(R^9)_2-$, where $R^9$ is as defined above.

14. The alkoxy-functional RTV composition according to claim 10, where each R and $R^9$ are methyl; x is 0; f is a value such that Component (A) has a viscosity within a range of about 5 to 150 Pa.s at 25° C.; and Z is

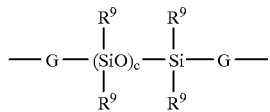

where G is ethylene; c is 1; and less than 25 percent of the chain terminations are organosilyl chain terminations described by $CH_2=CH-Si(R^9)_2-$, where $R^9$ is as defined above.

15. The alkoxy-functional RTV composition according to claim 11, where each R and $R^9$ are methyl; x is 0; f is a value such that Component (A) has a viscosity within a range of about 5 to 150 Pa.s at 25° C.; and Z is

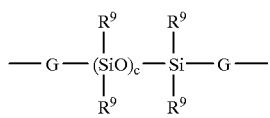

where G is ethylene, c is 1; and less than 25 percent of the chain terminations are organosilyl chain terminations described by $CH_2=CH-Si(R^9)_2-$, where $R^9$ is as defined above.

16. The alkoxy-functional RTV composition according to claim 2, where Component (C) is a reinforcing silica filler or a calcium carbonate.

17. The alkoxy-functional RTV composition according to claim 2, where Component (C) is a combination of a reinforcing silica and a ground calcium carbonate.

18. The alkoxy-functional RTV composition according to claim 15, where Component (C) is a combination of a reinforcing silica filler and a ground calcium carbonate.

19. The alkoxy-functional RTV composition according to claim 2, where Component (D) is methyltrimethoxysilane or dimethyldimethoxysilane.

20. The alkoxy-functional RTV composition according to claim 18, where Component (D) is methyltrimethoxysilane or dimethyldimethoxysilane.

21. The alkoxy-functional RTV composition according to claim 2, where Component (A) comprises a polyoxyalkylene or a polydiorganosiloxane.

22. An alkoxy-functional RTV composition, curable in the presence of moisture, obtained by mixing components comprising (A) polymers comprising on average at least 1.2 alkoxysilyl chain terminations per molecule described by $-SiR^1_x(OR)_{3-x}$, where each R is independently selected from the group consisting of methyl, ethyl, n-propyl, isopropyl, n-butyl, sec-butyl, and isobutyl, $R^1$ is selected from the group consisting of methyl and ethyl, and x is 0 or 1;

(B) a tetraalkoxytitanium compound comprising on average greater than 90 mole percent of the alkoxy groups as t-amyloxy groups;

(C) a filler having hydroxyl content derived from covalently bonded hydroxyl groups, adsorbed water, or both covalently bonded hydroxyl groups and adsorbed water; and (D) an alkoxysilane described by formula $R^4_z Si(OR^5)_{4-z}$, where each $R^4$ is independently selected from the group consisting of methyl, ethyl, and vinyl, each $R^5$ is independently selected from the group consisting of methyl and ethyl, and z is 1 or 2; with the proviso that components (A), (B), (C), and (D) are added in amounts such that a molar ratio (I) is at least 0.9 and a molar ratio (II) is at least 0.6, where $$\text{molar ratio (I)} = \frac{\text{moles Component(B)} + \text{moles Component (D)}}{\text{moles hydroxyl in Component (C)}}$$

and $$\text{molar ratio (II)} = \frac{\text{moles Component(B)}}{\text{moles Component (D)} + \text{moles alkoxysilyl chain terminations in Component (A)}}$$

23. The product according to claim 22, where molar ratio (I) is in the range of about 0.9 to 5 and molar ratio (II) is in the range of about 0.6 to 2.

24. A cured alkoxy-functional RTV composition obtained by exposing the alkoxy-functional RTV composition according to claim 2 to moisture.

* * * * *